May 3, 1927.
A. H. HANDLAN, JR
1,626,729
HOSE COUPLING
Filed June 23, 1920
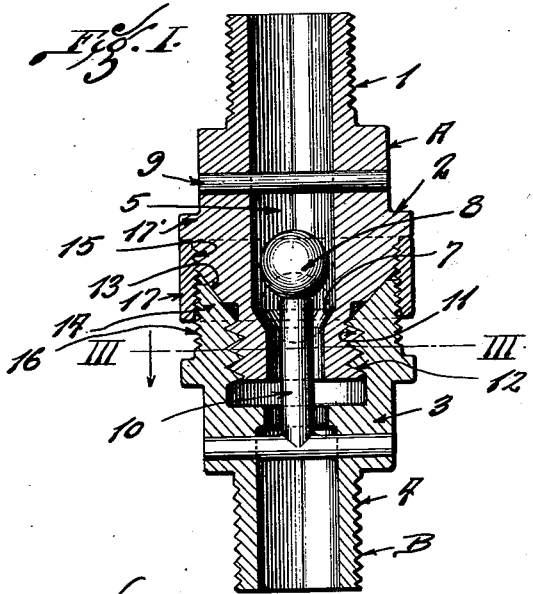
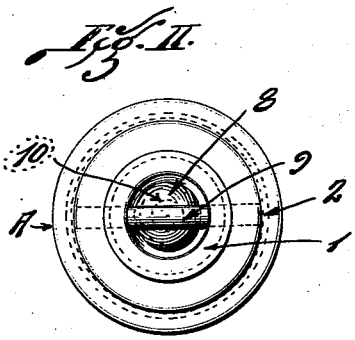
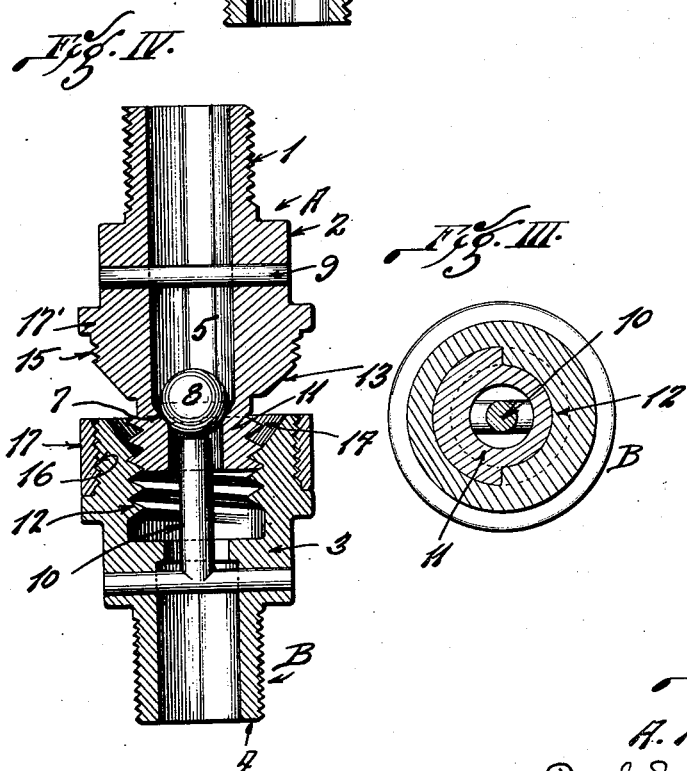
Inventor —
A. H. Handlan, Jr.
by Cook & McCauley Attys.

Patented May 3, 1927.

1,626,729

UNITED STATES PATENT OFFICE.

ALEXANDER H. HANDLAN, JR., OF ST. LOUIS, MISSOURI.

HOSE COUPLING.

Application filed June 23, 1920. Serial No. 390,988.

My invention relates to a hose or pipe coupling for use in conducting air or other fluid. One object of the invention is to provide a simple coupling device whereby two hose or pipe sections may be coupled together and detached from each other while the air or other fluid in one of the sections is under a high pressure. With this object in view, an automatic check valve in one of the coupling sections is opened after the coupling elements have been interlocked with each other, but before the completion of the coupling operation. The coupling elements are united by a simple operation whereby said elements are first interlocked with each other to prevent accidental separation in response to the pressure of a sudden blast of air or other fluid passing from one section to the other, and as the coupling operation is continued, the check valve is automatically opened to permit the escape of air from one section to the other. In disconnecting the sections, the automatic check valve is closed before the coupling elements are released from each other. Prior to this invention, persons have been injured by sudden forcible separation of the coupling sections during the operations of coupling and uncoupling such sections while they are subjected to a high fluid pressure, and it will be understood that the liability of such injury is eliminated by the operation of the device herein disclosed.

Another object is to produce a simple coupling device whereby the coupling elements may be securely united to prevent leakage without using a gasket or the like.

A further object is to provide a simple and effective means for locking the coupling sections after they have been united.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claim hereunto appended.

Fig. I is a vertical section of the device in its assembled or coupled position.

Fig. II is a top or plan view of the device.

Fig. III is a horizontal section on the line III—III of Fig. I.

Fig. IV is a view similar to Fig. I showing the device as it appears immediately before the plunger engages the check valve.

In the drawings A designates the primary section and B the secondary section of my hose coupling. The primary section A comprises a neck 1 to which a hose or pipe may be fitted and a head 2 for connection to the secondary section B. The secondary section comprises a head 3 and a neck 4, to the latter of which a hose or pipe may be fitted. The primary section A of my coupling contains a valve pocket 5 forming part of the passageway or bore through the section and at the forward end of said pocket is the valve seat 7. 8 designates a ball valve movable within the pocket 5 and adapted to rest upon the valve seat 7 and prevent the flow of fluid from the primary section A to the secondary section B of my coupling. The ball valve 8 is retained in the pocket by a cross pin 9 extending across the section A at the rear end of the valve pocket 5.

10 designates a valve-unseating plunger suitably mounted in the secondary section of my coupling, said plunger being located wholly within said secondary section and being of sufficient length to extend into the valve pocket 5 of the primary section A to move the ball valve 8 away from the valve seat 7 when the two sections A and B of the coupling are joined or coupled to each other. Thus it is seen that when the sections are joined, as shown in Fig. I, the valve 8 is held unseated and fluid under pressure may flow through the primary section A passing the valve therein and into and through the secondary section B.

The primary section A has at its forward end a reduced extension 11 projecting beyond a beveled annular seat 13 and provided with coarse coupling threads, adapted to cooperate with and thread into an interiorly threaded portion 12 provided in the forward end of the section B. The beveled seat 13 is adapted to engage a similar seat 14 at the end face of section B.

Both the sections A and B are externally threaded at 15 and 16 respectively to receive a sleeve 17 which acts as a jamb nut and bears against an annularly projecting shoulder 17' so as to lock the sections after they have been securely coupled by the coarse threads at 11 and 12.

The exteriorly threaded portions 15 and 16 are of uniform pitch, but of less pitch than the screw threads at 11 and 12, and owing to this difference in the threads, the jamb nut 17 serves as a very effective means for preventing independent rotation of the screw threaded elements.

The beveled seats 13 and 14 contact with each other to prevent leakage between the coupling sections, and this contact is obtained in response to a rotary motion when the section B is screwed onto the extension 11 of the section A. The sections may be repeatedly coupled and uncoupled without changing the points of contact at the beveled seats, and since one of the seats is rotated and at the same time forced onto the other seat, a very firm contact is obtained at the seats and there is a slight tendency to grind the beveled seats during each coupling and uncoupling operation.

As shown in Fig. IV, the coupling parts and valve actuating parts are so proportioned that in assembling or coupling the sections, the coarse threads 11 and 12 will engage prior to the unseating engagement of the plunger 10 with the ball valve 8. This preliminary engagement between the threads 11 and 12 is extremely desirable in that when the valve is lifted or opened the sections will already be partially coupled and thus the secondary section can not be blown away by a sudden blast of air from the primary section.

When the parts are in the positions shown by Fig. IV the forward annular edge of the sleeve 17 is flush with the beveled open end of the section B, and after the beveled seats contact with each other it is necessary to screw the sleeve 17 over the threaded portion 15 so that it abuts against the shoulder 17' in order to lock the sections in their coupled positions. When uncoupling, the sleeve is unscrewed from the threads 15, the threaded portions 11 and 12 are then unscrewed, the ball valve becoming closed or seated before the sections are entirely disconnected. Hence it is seen that a simple, safe leakproof coupling is provided in which there is no danger of the coupling sections becoming forcibly separated due to the unseating of the ball valve before the coupling is effective.

I claim:

A coupling comprising a pair of hollow sections having threaded portions whereby they are coupled together, each of said sections also having an exteriorly threaded portion the threads of which wind spirally in the same direction as those of the first mentioned threaded portions, and a jamb nut screwed onto the exteriorly threaded portions of both sections to lock said sections after they have been coupled together, the pitch of the exteriorly threaded portions being uniform with each other but different from the pitch of the first mentioned threaded portions, one of said sections being provided with an abutment engaged by said jamb nut when the latter is screwed onto both of said sections, and said sections being provided with mating smooth beveled seats which are forced into engagement with each other in response to a rotary motion of one of the first mentioned threaded portions.

In testimony that I claim the foregoing I hereunto affix my signature.

ALEXANDER H. HANDLAN, Jr.